United States Patent
Smith et al.

(10) Patent No.: US 6,408,271 B1
(45) Date of Patent: Jun. 18, 2002

(54) METHOD AND APPARATUS FOR GENERATING PHRASAL TRANSCRIPTIONS

(75) Inventors: Kenneth W. Smith, Verdun; Michael G. Sabourin, St. Lambert, both of (CA)

(73) Assignee: Nortel Networks Limited, St-Laurent (CA)

( * ) Notice: Subject to any disclaimer, the term of this patent is extended or adjusted under 35 U.S.C. 154(b) by 0 days.

(21) Appl. No.: 09/404,797

(22) Filed: Sep. 24, 1999

(51) Int. Cl.[7] .................. G01L 15/18; G01L 15/26; G01L 15/02
(52) U.S. Cl. .................. 704/257; 704/235; 704/239
(58) Field of Search .................. 704/9.1, 231, 258, 704/257, 235, 239

(56) References Cited

U.S. PATENT DOCUMENTS 5,675,819 A * 10/1997 Schuetze .................. 704/10
6,009,382 A * 12/1999 Martino et al. .................. 704/10
6,246,989 B1 * 6/2001 Poleyn .................. 704/275

OTHER PUBLICATIONS

Larsson et al ("Offline Dictionary–Based Compression," Data Compression Conference proceedings, Mar. 1999).*

* cited by examiner

Primary Examiner—Richemond Dorvil
Assistant Examiner—Daniel A Nolan

(57) ABSTRACT

The invention relates to a method and apparatus for generating phrasal transcriptions. The invention provides generating a group of word transcriptions for each vocabulary item in an orthographic phrase. According to a first embodiment, the invention further provides permuting the word transcriptions to generate a plurality of phrasal transcriptions and computing a score for each phrasal transcription in the plurality of phrasal transcriptions. The set of phrasal transcriptions is then selected from the plurality of phrasal transcriptions at least in part on a basis of the score data elements and stored in a format suitable for use by a speech recognition dictionary. As a variant, the phrasal transcriptions may be released in a format suitable for use by a speech synthesizer. According to a second embodiment, the invention further provides permuting the word transcriptions to generate the set of phrasal transcriptions, the permuting being characterized by yielding a higher likelihood of variability between the word transcriptions associated to a common vocabulary item among the set of phrasal transcriptions than a permuting rule using an outer-product procedure. The method further provides a computer readable medium comprising a program element operative to implement a method for generating a set of phrasal transcriptions.

24 Claims, 8 Drawing Sheets

METHOD AND APPARATUS FOR GENERATING PHRASAL TRANSCRIPTIONS

FIELD OF THE INVENTION

This invention relates to the field of speech recognition and speech synthesis. This invention is particularly applicable to the generation of speech recognition dictionaries including phrasal transcriptions for use in speech recognition systems as may be used in a telephone directory assistance system, voice activated dialing (VAD) system, personal voice dialing system and other speech recognition enabled services. This invention is also applicable to text-to-speech synthesizers for generating suitable pronunciations of phrases.

BACKGROUND OF THE INVENTION

Speech recognition enabled services are more and more popular today. The services may include stock quotes, directory assistance, reservations and many others.

In typical speech recognition systems, the user enters his request using isolated word, connected word or continuous speech via a microphone or telephone set. If valid speech is detected, the speech recognition layer of the system is invoked in an attempt to recognize the unknown utterance. Typically, entries in a speech recognition dictionary, usually including transcriptions associated to labels, are scored in order to determine the most likely match to the utterance. The recognition of speech involves aligning an input audio signal with the most appropriate target speech model. The target speech model for a particular vocabulary item is built by concatenating the speech models of the transcription or transcriptions associated to that particular vocabulary item.

Of particular interest here are speech recognizers capable of recognizing complete phrases. Speech recognition dictionaries used in such speech recognition systems often comprise transcriptions for complete phrases, herein designated as phrasal transcriptions. A phrasal transcription is a representation of the pronunciation of the associated complete phrase when uttered by a human. Each phrasal transcription is associated to a label indicative of the orthographic representation of the phrase, herein designated as the orthographic phrase. Typically, multiple phrasal transcriptions are provided for each orthographic phrase thereby allowing for different pronunciations of the phrase. A limit on the total number of phrasal transcriptions in a speech recognition dictionary is imposed due to the inherent computational limits of the speech recognizer as well as due to the memory requirements for storing the phrasal transcriptions. Typically, the limit on the total number of phrasal transcriptions is put into practice by limiting the maximum number of phrasal transcriptions stored for each phrase.

A number of methods have been explored for generating a set of phrasal transcriptions to be included in a speech recognition dictionary. Common methods make use of outer-product procedures to generate the set of phrasal transcriptions. In a typical interaction a group of word transcriptions is generated for each vocabulary item in the orthographic phrase. Following this, permutations of the word transcriptions are used to generate the phrasal transcription. A commonly used permuting rule, herein referred to as the F(i) permuting rule, can be mathematically defined as follows:

$$F(i) = \begin{cases} 1 + \prod_{x=1}^{x=i-1} N_x & \text{for } i > 1 \\ 1 & \text{for } i = 1 \end{cases}$$

where $N_i$ is the number of word transcriptions in the group of word transcriptions associated with the ith vocabulary item of the orthographic phrase. This permuting rule permutes the ith vocabulary item every F(i) phrasal transcription. A specific example will better illustrate this permuting rule. Consider the following orthographic phrase "Mary's little lamb" comprising three vocabulary items namely "Mary's ", "little" and "lamb". The vocabulary items are transcribed using a standard word transcription tool and yield a group of word transcriptions for each vocabulary item.

Mary's (i=1) -->/mEriz/, /Ariz/, m*riz/
little (i=2) -->/lIt*1/, lId*1/, /lIt*/, lId*/
lamb (i=3) -->/lamb/, /lam/

Each word transcription has a word transcription probability associated to it. In this specific example, the word transcription probabilities are as follows:

p(/mEriz/|"Mary's)=0.7
p(/mAriz/|"Mary's")=0.2
p(/m*riz/|"Mary's")=0.1
p(/lIt*1/|"little")=0.46
p(/lId*1/|"little")=0.44
p(/lIt*/|"little")=0.06
p(/lId*/|"little")=0.04
p(/lamb/|"lamb")=0.6
p(/lam/|"lamb")=0.4

The word transcription probabilities are used to order and truncate the list of word transcriptions. Typically, the word transcriptions are sorted by likelihood, meaning that the first word transcription has a highest transcription probability. Assuming a word transcription limit of 2 word transcriptions per vocabulary item, the two word transcriptions having the highest score are kept and the remaining word transcriptions are discarded. In this specific example this results in the following word transcription groups for the vocabulary items in the orthographic phrase:

Mary's -->/mEriz/, /mAriz/
little --->lIt*1/, lId*1/
lamb -->/lamb/, /lam/

In the above word transcription groups, the $3^{rd}$ word transcription for "Mary's" and the $3^{rd}$ and $4^{th}$ word transcriptions for "little" have been deleted from the original list. The word transcriptions are then permuted according to the F(i) permuting rule and concatenated leading to the following phrasal transcriptions:

mEriz lIt*1 lamb
mAriz lIt*1 lamb
mEriz lId*1 lamb
mAriz lId*1 lamb
mEriz lIt*1 lam
mAriz lIt*1 lam
mEriz lId*1 lam
mAriz lId*1 lam For this specific example, the F(i) permuting rule generated eight permutations of the word transcriptions, with variations of the first word transcription occurring between each phrasal transcription, with variations of the second word transcription occurring every second phrasal transcription and variations of the third word transcription occurring every fourth phrasal transcription. Assuming a phrasal transcription limit of 4 transcriptions per phrase, we then have:

mEriz lIt*l lamb
mAriz lIt*l lamb
mEriz lId*l lamb
mAriz lId*l lamb

A deficiency of the above-described method is that it emphasizes variations from left-to-right. More specifically, the vocabulary item in the first position in the phrase, in the set of selected phrasal transcriptions, has its word transcriptions permuted several times while vocabulary items appearing later on in the phrase are varied less frequently or not at all as the above example illustrates. Consequently, variations in pronunciations for vocabulary items appearing later in a phrase is modeled less effectively that variations for vocabulary items appearing closer to the beginning of a phrase.

Another deficiency of the above noted method is that it does not reflect any probability information associated to the word transcriptions other than to truncate the groups of word transcriptions. Additionally, the above-described method does not provide any mechanism for including language probability information in the selection of the set of phrasal transcriptions.

Thus, there exists a need in the industry to refine the process of selecting a set of transcriptions such as to obtain an improved set of phrasal transcriptions capable of being used by speech recognition dictionary or by a text to speech synthesizer.

SUMMARY OF THE INVENTION

The present invention is directed to the generation of phrasal transcriptions.

In accordance with a broad aspect, the invention provides a method for generating a set of phrasal transcriptions suitable for use in a speech recognition dictionary. The method comprises providing an orthographic phrase comprising a set of vocabulary items. The method further comprises generating a group of word transcriptions for each vocabulary item in the orthographic phrase, each word transcription in the group of word transcriptions for a given vocabulary item being associated to an ordering data element. The ordering data elements establish a relationship between the word transcriptions in the group of word transcriptions. The method further comprises permuting the word transcriptions to generate a plurality of phrasal transcriptions, each word transcription of a phrasal transcription in the plurality of phrasal transcriptions being selected from the group of word transcriptions associated to the corresponding vocabulary item. The method further comprises computing a score data element for each phrasal transcription in the plurality of phrasal transcriptions on a basis of ordering data elements associated to the word transcriptions in a phrasal transcription. The set of phrasal transcriptions is then selected from the plurality of phrasal transcriptions at least in part on a basis of the score data elements. The set of phrasal transcriptions is then stored in a format suitable for use by a speech recognition dictionary.

In accordance with another broad aspect, the invention further provides an apparatus for implementing the above-described method.

In accordance with another broad aspect, the invention provides a computer readable medium containing a program element suitable for execution by a computing apparatus for implementing the above-described method.

In accordance with another broad aspect, the invention further provides a computer readable medium containing a speech recognition dictionary comprising phrasal transcriptions generated by the above-described method.

An advantage of the present invention is that variations in word transcriptions do not depend on the position of the word but on the score data element associated to the phrasal transcriptions, the score data elements being derived on a basis of ordering data elements.

In a specific example of implementation, the ordering data elements are word transcription probabilities. Advantageously, the use of word transcription probabilities in computing the score data elements allows reflecting probability information associated to the word transcriptions in the selection of the set of phrasal transcriptions. Consequently, variations in pronunciations for vocabulary items are not dependent on the position of the vocabulary item in the phrase.

Preferably but not essentially, each word transcription is associated to a language probability data element, the score data element being further derived on a basis of the language probability data element. Alternatively, each phrasal transcription is associated to a language probability data element, the score data element being further derived on a basis of the language probability data element.

Advantageously, the use of language probability in the computation of the score data element provides a mechanism for including language probability information in the selection of the set of phrasal transcriptions.

In accordance with another broad aspect, the invention provides a method for generating a set of phrasal transcriptions for use in a speech recognition dictionary. The method comprises providing an orthographic phrase comprising a set of vocabulary items. The method further comprises generating for each vocabulary item in the set of vocabulary items a group of word transcriptions. A group of word transcriptions comprises $N_i$ word transcriptions where i is the position of the vocabulary item in the orthographic phrase to which the group of word transcriptions is associated. The method further comprises permuting the word transcriptions to generate the set of phrasal transcriptions, each word transcription of a phrasal transcription of the set of phrasal transcriptions being selected from the group of word transcriptions associated to the corresponding vocabulary item. Permuting the word transcriptions is characterized by yielding a higher likelihood of variability between the word transcriptions associated to a common vocabulary item among the set of phrasal transcriptions than a permuting rule F(i) where i is an integer value indicative of the position of the vocabulary item in the orthographic phrase. The set of phrasal transcriptions is then stored in a format suitable for use by a speech recognition dictionary.

In accordance with another broad aspect, the invention provides an apparatus for implementing the above-described method.

In accordance with another broad aspect, the invention provides a computer readable medium containing a program element suitable for execution by a computing apparatus for implementing the above-described method.

In accordance with another broad aspect, the invention provides a computer readable medium containing a speech recognition dictionary. The speech recognition dictionary comprises a set of phrasal transcriptions associated to an orthographic phrase, the phrasal transcriptions being comprised of word transcriptions associated to respective vocabulary items in the orthographic phrase. The set of phrasal transcriptions is characterized in having higher variability between the word transcriptions associated to a common vocabulary item among the set of phrasal transcriptions than a permuting rule F(i) where i is an integer value indicative of the position of the vocabulary item in the orthographic phrase.

For the purpose of this specification the expression "word transcription" is used to designate the acoustic representation a vocabulary item as a sequence of sub-word units representative of a pronunciation of the vocabulary item. A number of acoustic sub-word units can be used in a transcription such as phonemes, allophones, triphones, syllables and dyads (demi-syllables). Commonly, the phoneme is used as the sub-word unit and the representation is designated as "phonemic word transcription".

For the purpose of this specification the expression "phrasal transcription" is used to designate the acoustic representation a phrase as a sequence of word transcriptions. A phrasal transcription is representative of a pronunciation of the associated phrase.

For the purpose of this specification the expression "orthographic phrase" is used to designate the representation of a phrase in the form of symbols from a language alphabet. An orthographic phrase can have many pronunciations, each pronunciation being associated to a respective phrasal transcription.

Other aspects and features of the present invention will become apparent to those ordinarily skilled in the art upon review of the following description of specific embodiments of the invention in conjunction with the accompanying figures.

DETAILED DESCRIPTION

Figure 1:
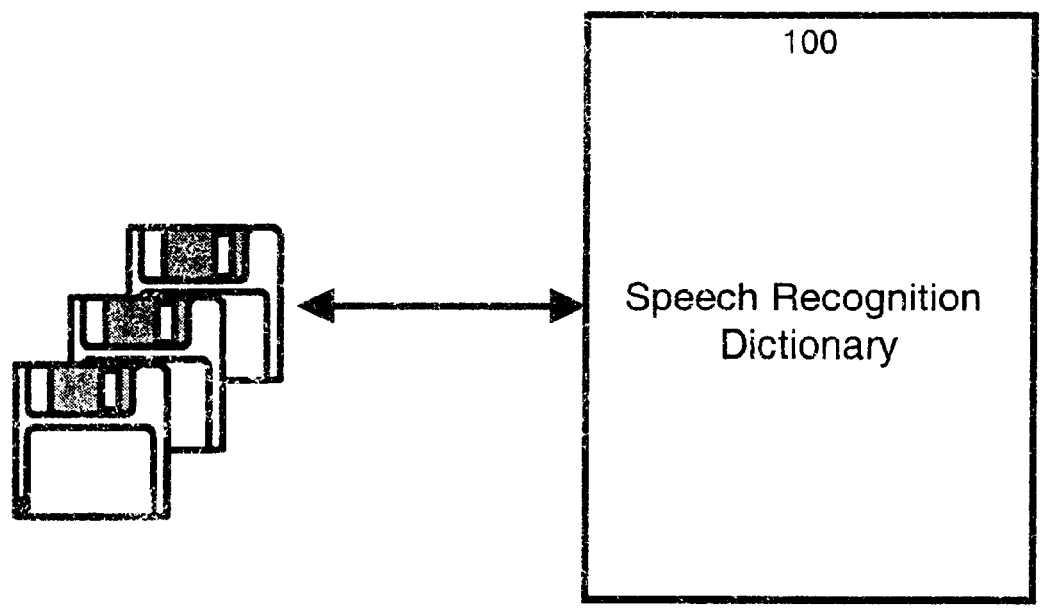
FIG. 1 shows a computer readable medium holding a speech recognition dictionary comprising phrasal transcriptions in accordance with an embodiment of the invention.

In a preferred embodiment, as shown in FIG. 1, the invention provides a computer readable storage medium comprising a data structure containing a speech recognition dictionary 100. The speech recognition dictionary 100 is suitable for use in a speech recognition system for recognizing spoken phrases. The speech recognition dictionary comprises a set of phrasal transcriptions associated to an orthographic phrase. The phrasal transcriptions are comprised of word transcriptions associated to respective vocabulary items in the orthographic phrase.

Figure 2:
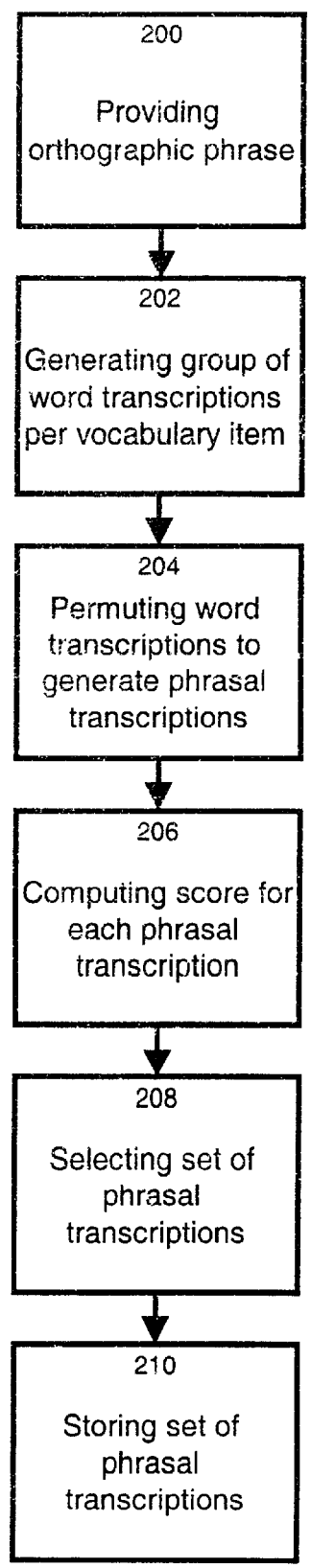
FIG. 2 shows a flow diagram for generating a set of phrasal transcriptions in accordance with an embodiment of the invention.

In accordance with a first embodiment, the invention provides a method for generating the phrasal transcriptions suitable for us in a speech recognition dictionary 100 of the type shown in FIG. 1. As shown in FIG. 2 of the drawings, the method comprises providing 200 an orthographic phrase comprising a set of vocabulary items. In a specific example of implementation, step 200 is effected by providing a computer readable medium such as a diskette, hard drive, data channel, CD-ROM or any other suitable device, containing an electronic representation of the orthographic phrase. The method further comprises generating 202 a group of word transcriptions for each vocabulary item in the orthographic phrase. Step 202 is effected by using an automatic transcription method such as text to phoneme rules or by using a transcription dictionary. Such automatic transcription methods are well-known in the art to which this invention pertains. For more information on the generation of word transcriptions, the reader is invited to consult "Automatic Rule-Based Generation of Word Pronunciation Networks" Nick Cremelie et al., ISSM 1018–4074, pp.2459–2462, 1997 whose content is hereby incorporated by reference. Continuing the specific example of the orthographic phrase "Mary's little lamb", three groups of word transcriptions are generated each group being associated to the corresponding vocabulary item:

Mary's -->/mEriz/, /mAriz/, m*riz/ little -->/lIt*l/, lId*l/, /lIt*/, lId*/ lamb -->/lamb/, /lam/

Preferably, each word transcription in the group of word transcriptions for a given vocabulary item is associated to an ordering data element. The ordering data elements establish a relationship between the word transcriptions in the group of word transcriptions. The method further provides permuting 204 the word transcriptions to generate a plurality of phrasal transcriptions, each word transcription of a phrasal transcription in the plurality of phrasal transcriptions being selected from the group of word transcriptions associated to the corresponding vocabulary item. The method further provides computing 206 a score data element for each phrasal transcription in the plurality of phrasal transcriptions on a basis of ordering data elements *associated to the word transcriptions in a phrasal transcription. The method further provides selecting 208 the set of phrasal transcriptions from the plurality of phrasal transcriptions at least in part on a basis of the score data elements and storing 210 the set of phrasal transcriptions in a format suitable for use by a speech recognition dictionary. In a specific example, an electronic representation of the phrasal transcriptions is stored on a computer readable medium such as mass-storage medium, ROM unit or any other suitable device.

In a specific example of implementation, the word transcriptions in the groups of word transcriptions are associated to an ordering data element assigned on a basis of word transcription probabilities. Word transcription probabilities may be obtained from the automatic transcription generators or may be introduced artificially such as by using a table of default probability values assigned on the basis of the precedence of the word transcription. In a specific example, each word transcription is assigned an integer value based on it's rank in the group of word transcriptions. Continuing the above specific example, ordering data elements are numerical values and are assigned to the word transcriptions:

Ordering data element (/mEriz/|"Mary's)=1
Ordering data element (/mAriz/|"Mary's")=2
Ordering data element (/m*riz/|"Mary's")=3
Ordering data element (lIt*l/|"little")=1
Ordering data element (/lId*l/|"little")=2
Ordering data element (/lIt*/|"little"=3
Ordering data element (/lId*/|"little")=4
Ordering data element (/lamb/|"lamb")=1
Ordering data element (/lam/|"lamb")=2

At step 204, permutations of the word transcriptions in the phrasal transcription are generated. Generating permutations is well-known in the art to which this invention pertains. At step 206, a score is computed for each phrasal transcription at least in part on the basis of the ordering data elements. In a specific example, the score data element for a given phrasal transcription is computed by taking the sum of the ordering data element associated to the word transcriptions in the given phrasal transcription. Continuing the example, the following phrasal transcriptions and associated score data elements are obtained:

| Score | Phrasal Transcription |
|---|---|
| 3 | mEriz lIt*1 lamb |
| 4 | mAriz lIt*1 lamb |
| 5 | m*riz lIt*1 lamb |
| 4 | mEriz lId*1 lamb |
| 5 | mAriz lId*1 lamb |
| 6 | m*riz lId*1 lamb |
| 4 | mEriz lIt*1 lam |
| 5 | mAriz lIt*1 lam |
| 6 | m*riz lIt*1 lam |
| 5 | mEriz lId*1 lam |
| 6 | mAriz lId*1 lam |
| 7 | m*riz lId*1 lam |
| 5 | mEriz lIt* lamb |
| 6 | mAriz lIt* lamb |
| 7 | m*riz lIt* lamb |
| 6 | mEriz lId* lamb |
| 7 | mAriz lId* lamb |
| 8 | m*riz lId* lamb |
| 7 | mEriz lIt* lam |
| 8 | mAriz lIt* lam |
| 9 | m*riz lIt* lam |
| 8 | mEriz lId* lam |
| 9 | mAriz lId* lam |
| 10 | m*riz lId* lam |

In a specific example of implementation, all permutations of the word transcriptions are effected to generate the plurality of phrasal transcriptions. The phrasal transcriptions are then ordered according to the score data elements. In this specific example, the lowest score is indicative of a high likelihood and the phrasal transcriptions are ordered from the lowest score to the highest score as shown below:

3: mEriz lIt*1 lamb
4: mAriz lIt*1 lamb
4: mEriz lId*1 lamb
4: mEriz lIt*1 lam
5: m*riz lIt*1 lamb
5: mAriz lId*1 lamb
5: mariz lIt*1 lam
5: mEriz lIt* lamb etc . . .

At step 208, the set of phrasal transcriptions is selected from the plurality of phrasal transcriptions on the basis of the score data elements. If N phrasal transcriptions can be added to a speech recognition dictionary for a given orthographic phrase, the N lowest scoring phrasal transcriptions are selected. In a specific example, assuming there is a phrasal transcription limit of 4 phrasal transcriptions for the orthographic phrase "Mary's little lamb", the above described embodiment will select the following phrasal transcriptions:

3: mEriz lIt*1 lamb
4: mAriz lIt*1 lamb
4: mEriz lId*1 lamb
4: mEriz lIt*1 lam

Following this at step 210 the selected set of phrasal transcriptions is stored in a format suitable for use by a speech recognition dictionary.

In a second specific example of implementation, the ordering data elements associated to word transcriptions in the groups of word transcriptions are the word transcription probabilities. The word transcription probabilities are combined at step 206 to compute the score for the phrasal transcriptions. In a specific example, each word transcription and its word transcription probability is independent. Alternatively, the word transcription and its word transcription probability may be dependent on the context of the orthographic phrase, on the language of origin or other useful environmental factor. Consequently, the expression "word transcription probability" should be construed as comprising either context independent probability information or a combination of context independent and context dependent probability information without detracting from the spirit of the invention. The score data elements are computed by multiplying the word transcription probabilities during step 206. The score data elements are representative of the phrasal transcription probabilities and are used to order the phrasal transcriptions. The phrasal transcriptions with the highest ranking probabilities are selected for the set of phrasal transcriptions. Mathematically, the computation of the score at step 206 can be expressed as follows:

$$P(\text{phrasal transcription}|\text{phrase})=\text{product}[P(\text{word transcription}|\text{word})]$$

Continuing the example of Mary's little lamb and considering the following word transcription probabilities:

p(mEriz/|"Mary's)=0.7
p(/mAriz/|"Mary's")=0.2
p(/m*riz/|"Mary's")=0.1
p(/lIt*l/|"little")=0.46
p(/lId*l/|"little")=0.44
p(/lIt*/|"little")=0.06
p(/lId*/|"little")=0.04
p(/lamb/|"lamb")=0.6
p (/lam/|"lamb")=0.4

The scores for the phrasal transcription probabilities are given as follows:

0.193: mEriz lIt*1 lamb
0.055: mAriz lIt*1 lamb
0.027: m*riz lIt*1 lamb
0.185: mEriz lId*1 lamb
0.053: mAriz lId*1 lamb
0.026: m*riz lId*1 lamb
0.129: mEriz lIt*1 lam
0.037: mAriz lIt*1 lam
0.018: m*riz lIt*1 lam
0.123: mEriz lId*1 lam
0.035: mAriz lId*1 lam 0.017: m*riz lId*1 lam
0.017: mEriz lIt* lamb
0.005: mAriz lIt* lamb
0.002: m*riz lIt* lamb
0.011: mEriz lId* lamb
0.003: mAriz lId* lamb
0.001: m*riz lId* lamb
0.017: mEriz lIt* lam
0.005: mAriz lIt* lam
0.002: m*riz lIt* lam
0.011: mEriz lId* lam
0.003: mAriz lId* lam
0.001: m*riz lId* lam After sorting the phrasal transcriptions on a basis of the score data element with the high scores first, the following ordered list of phrasal transcriptions is obtained:

0.193: mEriz lIt*1 lamb
0.185: mEriz lId*1 lamb
0.129: mEriz lIt*1 lam
0.123: mEriz lId*1 lam
0.055: mAriz lIt*1 lamb
0.053: mAriz lId*1 lamb
0.037: mAriz lIt*1 lam
0.035: mAriz lId*1 lam
0.027: m*riz lIt*1 lamb
0.026: m*riz lId*1 lamb etc . . .

At step 208, the set of phrasal transcriptions is selected from the plurality of phrasal transcriptions on the basis of the score data element. If N phrasal transcriptions can be added to a speech recognition dictionary for a given orthographic phrase, the N highest scoring phrasal transcriptions are selected. In a specific example, assuming there is a phrasal transcription limit of 4 phrasal transcriptions for the orthographic phrase "Mary's little lamb", the above described embodiment method will select the following phrasal transcriptions:

mEriz lIt*1 lamb
mEriz lId*1 lamb
mEriz lIt*1 lam
mEriz lId*1 lam

Following the selection of the phrasal transcriptions, at step 210 the selected set of phrasal transcriptions is stored in a format suitable for use by a speech recognition dictionary. Other variants of the above described method will be readily apparent to those skilled in the art to which this invention pertains.

It is to be noted that the assignment of word probabilities need not be a precise measure of the probability of these word transcriptions being used in the language. The word probabilities may be based on generalized statistics that were trained in a separate procedure using a training dictionary.

Advantageously, the present invention allows the application of the above-described method when the word transcriptions do not have pre-assigned probabilities by either a dictionary or an automatic transcription tool. In a specific example of implementation, the group of word transcriptions assigned to a given vocabulary item is an ordered grouping where the first word transcription is deemed the most probable or most preferred word transcription and the last word transcription is deemed the least preferred or least probable word transcription. A heuristic rule is applied to assign numerical probability values to the word transcriptions. The first transcription is assigned a higher probability than ensuing transcriptions. In a specific example, if there is one word transcription, then a probability of 1.0 is assigned. If there are 2 word transcriptions, then the first transcription is assigned a probability of 0.6 and the second 0.4 and so on.

As a variant, each word transcription is further associated to a language probability data element indicative of a likelihood the vocabulary item associated to the word transcription is drawn from a specific language. In a specific example of implementation, an onomastic process is used to assign language probability values to vocabulary items. An example of an onomastic process that may be used here is a text based language identification algorithm that determines an associated probability value for the language on the basis of the orthography of the vocabulary item. As a variant, a phonetician or operator using heuristic measures may assign language probabilities. As a specific example, the vocabulary item "Robert" may be assigned the following language probabilities:

P(English|"Robert")=0.5
P(French|"Robert")=0.4
P(German|Robert")=0.007

In step 206, language probability data elements are incorporated in the computation of the score data elements. Mathematically, specific example of the incorporation of language probabilities can be expressed as follows:

$$p(\text{trans.}|\text{phrase}) = p(\text{lang}|\text{phrase}) \text{product} \{p(\text{word trans.}, \text{lang}|\text{voc.item})\} \quad (1)$$

or $$p(\text{trans.}|\text{phrase}) = \text{product} \{p(\text{lang.}|\text{voc. item}) p(\text{word trans.}, \text{lang.}|\text{voc.item})\} \quad (2)$$

In the first mathematical equation, the phrase is assigned a language probability. In the second mathematical equation, each vocabulary item is assigned a language probability.

Figure 3:
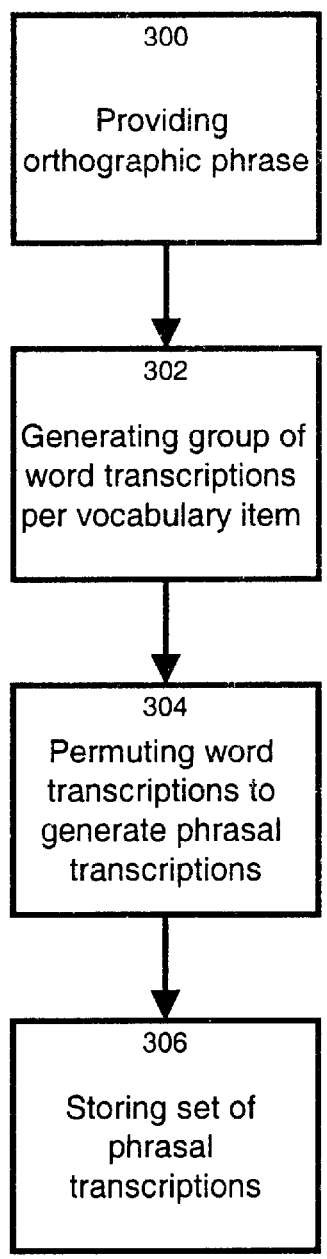
FIG. 3 shows a flow diagram for generating a set of phrasal transcriptions in accordance with an alternative embodiment of the invention.

In accordance with a second embodiment, as shown in FIG. 3 of the drawings, the invention provides a method for generating a set of phrasal transcriptions for use in a speech recognition dictionary. The method comprises providing 300 an orthographic phrase comprising a set of vocabulary items. The method further comprises generating 302 for each vocabulary item in the set of vocabulary items a group of word transcriptions. Generating a group of word transcriptions is well known in the art to which this invention pertains. A given group of word transcriptions comprises Ni word transcriptions where i is the position of the vocabulary item in the orthographic phrase to which the group of word transcriptions is associated. In a specific example, the first vocabulary item in the orthographic phrase is assigned i=1, the second vocabulary item i=2 and so on. The invention further comprises permuting 304 the word transcriptions to generate the set of phrasal transcriptions, each word transcription of a phrasal transcription of the set of phrasal transcriptions being selected from the group of word transcriptions associated to the corresponding vocabulary item. The permuting is characterized by yielding a higher likelihood of variability between the word transcriptions associated to a common vocabulary item among the set of phrasal transcriptions than a permuting rule F(i) where i is an integer value indicative of the position of the vocabulary item in the orthographic phrase. The method further provides storing 306 the set of phrasal transcriptions in a format suitable for use in a speech recognition dictionary. In a specific example, an electronic representation of the phrasal transcriptions is stored on a computer readable medium such as mass-storage medium, ROM unit or any other suitable device.

In a specific example of implementation, at step 302 a group of word transcriptions is generated for each vocabulary item in the orthographic phrase. The permuting of step 304 is effected on a basis of an ordered series of permutation prototypes for each orthographic phrase. A prototype is a set of integers {L, M, N}, and a as shorthand notation for "select the Lth transcription of the first word, select the Mth transcription of the second word, and select the Nth transcription of the third word". The first prototype, herein referred to as the identity prototype is applied, generating an initial phrasal transcription equivalent to the combination of the top choice word transcriptions for each vocabulary item in the phrase. Continuing our example, the identity prototype for the phrase "Mary's little lamb" is {1,1,1}. This corresponds to phrasal transcription "mEriz lIt*1 lamb". The second prototype is applied, yielding a maximum of "K" additional phrasal transcriptions where K is the total number of vocabulary items in the phrase.

In the specific example of the phrase "Mary's little lamb", the phrase comprises three vocabulary items. The second prototype is determined by perturbing the first entry by one, yielding {2,1,1}. Applying this prototype across the phrase yields 3 variants: {2,1,1}, {1,2,1}, {1,1,2}, which correspond to transcriptions "mAriz lIt*1 lamb", "mEriz lId*1 lamb", and "mEriz lIt*1 lam". The third prototype is determined by perturbing the second entry of the second prototype , yielding {2,2,1}. Applying this prototype yields 3 variants {2,2,1}, {2,1,2}, {1,2,2,}. Successive prototypes are applied, until the phrasal transcription limit is reached. This process continues, yielding the prototypes described in the table below.

| Prototype rank | Prototype | Number of variants | Variants |
|---|---|---|---|
| 1 | 1,1,1 | 1 | 1,1,1 |
| 2 | 2,1,1 | 3 | 2,1,1 - 1,2,1 - 1,1,2 |
| 3 | 2,2,1 | 3 | 2,2,1 - 2,1,2 - 1,2,2 |
| 4 | 2,2,2 | 1 | 2,2,2 |
| 5 | 3,1,1, | 3 | 3,1,1 - 1,3,1 - 1 1 3 |
| 6 | 3,2,1 | 6 | 3,2,1 - 3,1,2 - 2,3,1 - 2,1,3 - 1,3,2 - 1,2,3 |
| 7 | 3,2,2 | 3 | . . . |
| 8 | 3,3,1 | 3 | . . . |
| 9 | 3,3,2 | 3 | . . . |
| 10 | 3,3,3, | 1 | |

Assuming there is a phrase transcription limit of 4, the method will select the transcriptions:

mEriz lIt*1 lamb
mAriz lIt*1 lamb
mEriz lId*1 lamb
mEriz lIt*1 lam

The above described method may be applied to a phrase comprising any number of vocabulary items by generating the appropriate set of prototypes.

Advantageously, applying the prototypes until the phrasal transcription limit is reached allows a reduction in computation since less that all possible permutations need to be generated. Once the phrase transcription limit is reached, the prototype computation can stop, saving computation. This is particularly useful for phrases having a large number of vocabulary items or when vocabulary items in the phrase are associated with a large number of word transcriptions.

Figure 4:
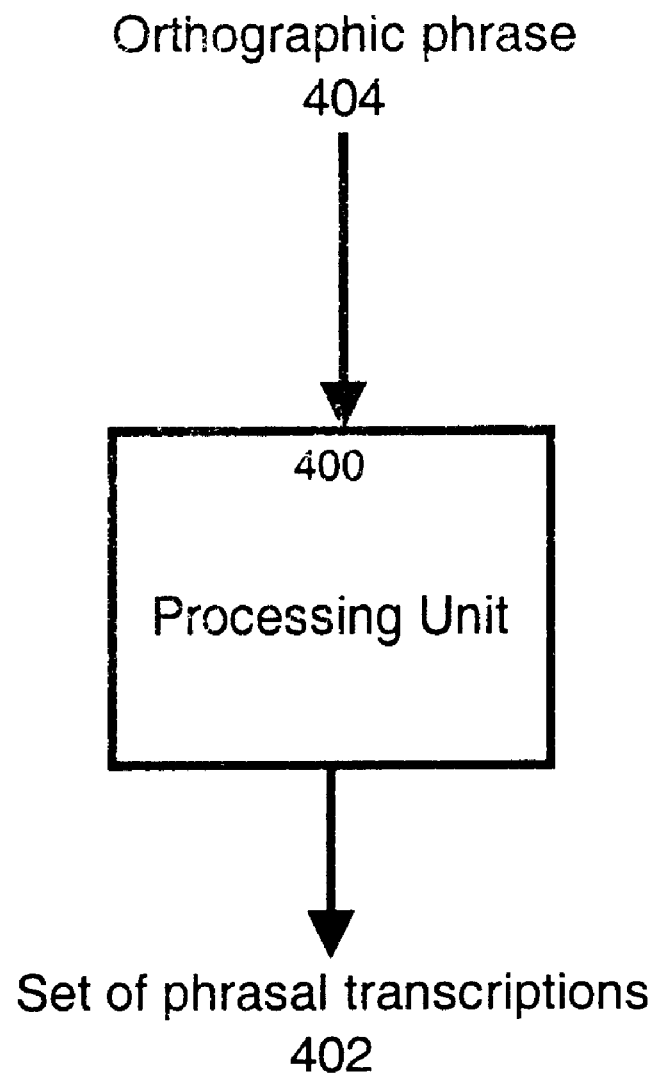
FIG. 4 shows a high-level block diagram of an apparatus for generating a set of phrasal transcriptions in accordance with the spirit of the invention.

In accordance with a third embodiment, as shown in FIG. 4, the invention provides an apparatus for generating a speech recognition dictionary suitable for use in a speech recognition system. The apparatus comprises an input 404 for receiving data elements representative of an orthographic phrase comprising a set of vocabulary items. The apparatus further comprises a processing unit coupled to the input 404 and an output 402 coupled to said processing unit for releasing the set of phrasal transcriptions in a format suitable for use by a speech recognition dictionary. The processing unit 400 is adapted to implement the method described in connection with FIG. 2 of the drawings and optionally the variants on the method described in connection with FIG. 2 of the drawings. In accordance with another embodiment, the processing unit 400 is adapted to implement the method described in connection with FIG. 3 of the drawings and optionally the variants on the method described in connection with FIG. 3 of the drawings.

Figure 5:
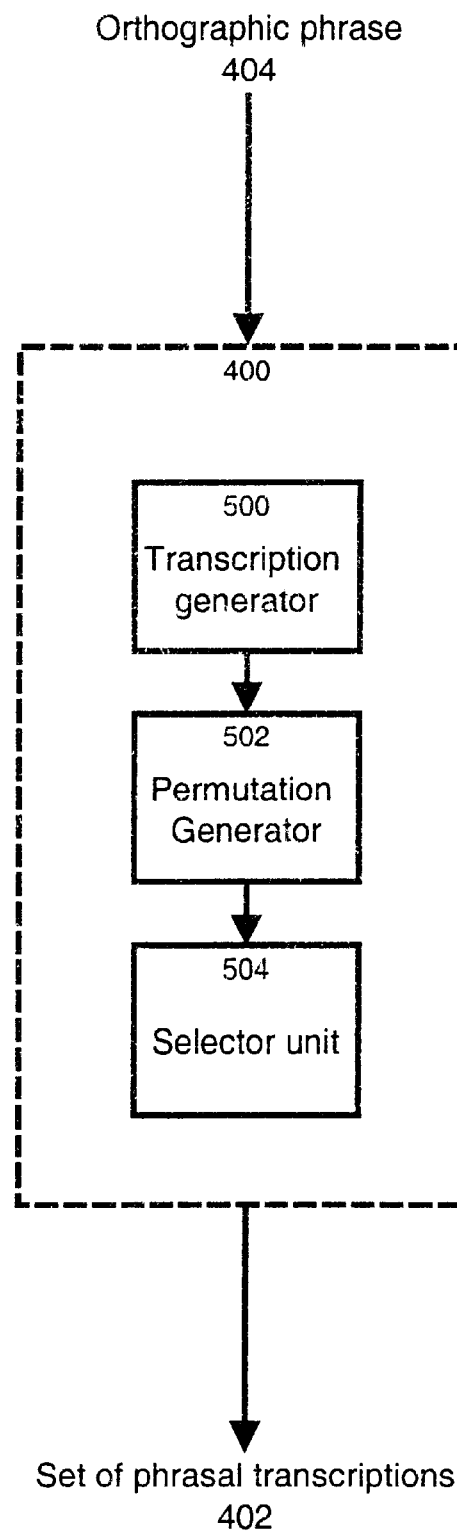
FIG. 5 shows a detailed block diagram of the apparatus of FIG. 4 for generating a set of phrasal transcriptions in accordance with an embodiment of the invention.

In a first specific example of implementation, the processing unit 400 is operative for generating a group of word transcriptions for each vocabulary item in the orthographic phrase. Each word transcription in the group of word transcriptions for a given vocabulary item is associated to an ordering data element, the ordering data elements establishing a relationship between the word transcriptions in the group of word transcriptions. The processing unit 400 is further operative for permuting the word transcriptions to generate a plurality of phrasal transcriptions, each word transcription of a phrasal transcription in the plurality of phrasal transcriptions being selected from the group of word transcriptions associated to the corresponding vocabulary item. The processing unit 400 is further operative for computing a score data element for each phrasal transcription in the plurality of phrasal transcriptions on a basis of ordering data elements associated to the word transcriptions in a phrasal transcription. The processing unit is further operative for selecting the set of phrasal transcriptions from the plurality of phrasal transcriptions at least in part on a basis of the score data elements. FIG. 5 of the drawings shows the first specific example of implementation of the processing unit 400. The processing unit 400 comprises a transcription generator 500, a permutation generator unit 502 and a selector unit 504. The transcription generator 500 generates a group of word transcriptions for each vocabulary item in the orthographic phrase. The permutation generator unit 502 is coupled to the automatic transcription generator 500 and permutes the word transcriptions to generate a plurality of phrasal transcriptions. The phrasal transcription selector unit 504 is coupled to the permutation generator unit and is operative for computing a score data element for each phrasal transcription in the plurality of phrasal transcriptions. The phrasal transcription selector unit 504 is also operative for selecting the set of phrasal transcriptions from the plurality of phrasal transcriptions.

Figure 6:
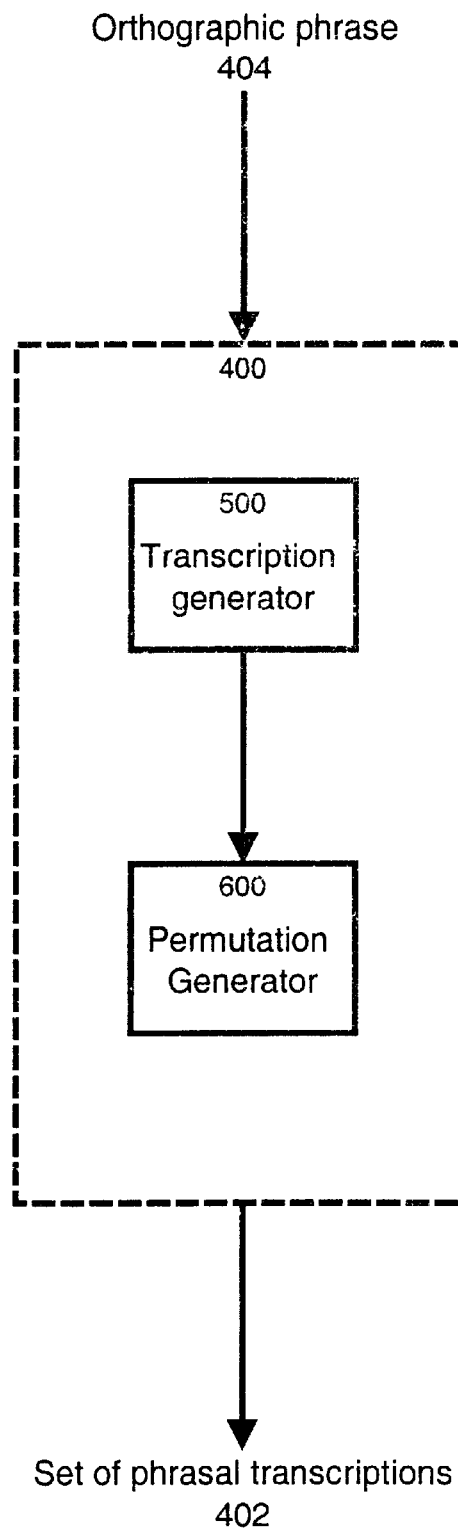
FIG. 6 shows a detailed block diagram of the apparatus of FIG. 4 for generating a set of phrasal transcriptions in accordance with an alternative embodiment of the invention.

In a second specific example of implementation, the processing unit 400 is operative for generating for each vocabulary item in the set of vocabulary items a group of word transcriptions. A group of word transcriptions comprises $N_i$ word transcriptions where i is the position of the vocabulary item in the orthographic phrase to which the group of word transcriptions is associated. The processing unit is further operative for permuting the word transcriptions to generate the set of phrasal transcriptions, each word transcription of a phrasal transcription of the set of phrasal transcriptions being selected from the group of word transcriptions associated to the corresponding vocabulary item. The permuting is characterized by yielding a higher likelihood of variability between the word transcriptions associated to a common vocabulary item among the set of phrasal transcriptions than a permuting rule of F(i) where i is an integer value indicative of the position of the vocabulary item in the orthographic phrase. FIG. 6 of the drawings shows the second specific example of implementation of the processing unit 400. The processing unit 400 comprises a transcription generator 500, a permutation generator unit 600. The transcription generator 500 generates a group of word transcriptions for each vocabulary item in the orthographic phrase. The permutation generator unit 600 is coupled to the automatic transcription generator 500 and permutes the word transcriptions to generate a plurality of phrasal transcriptions in accordance with the method described in this specification.

The apparatus depicted in FIG. 4 comprises a processor coupled to a computer readable storage medium, the computer readable storage medium comprising a program element for execution by the processor for implementing the processing unit 400. As a variant, the processing unit 400 is a hardware device such as a ROM or other chip programmed on the basis of the above described method.

Figure 7:
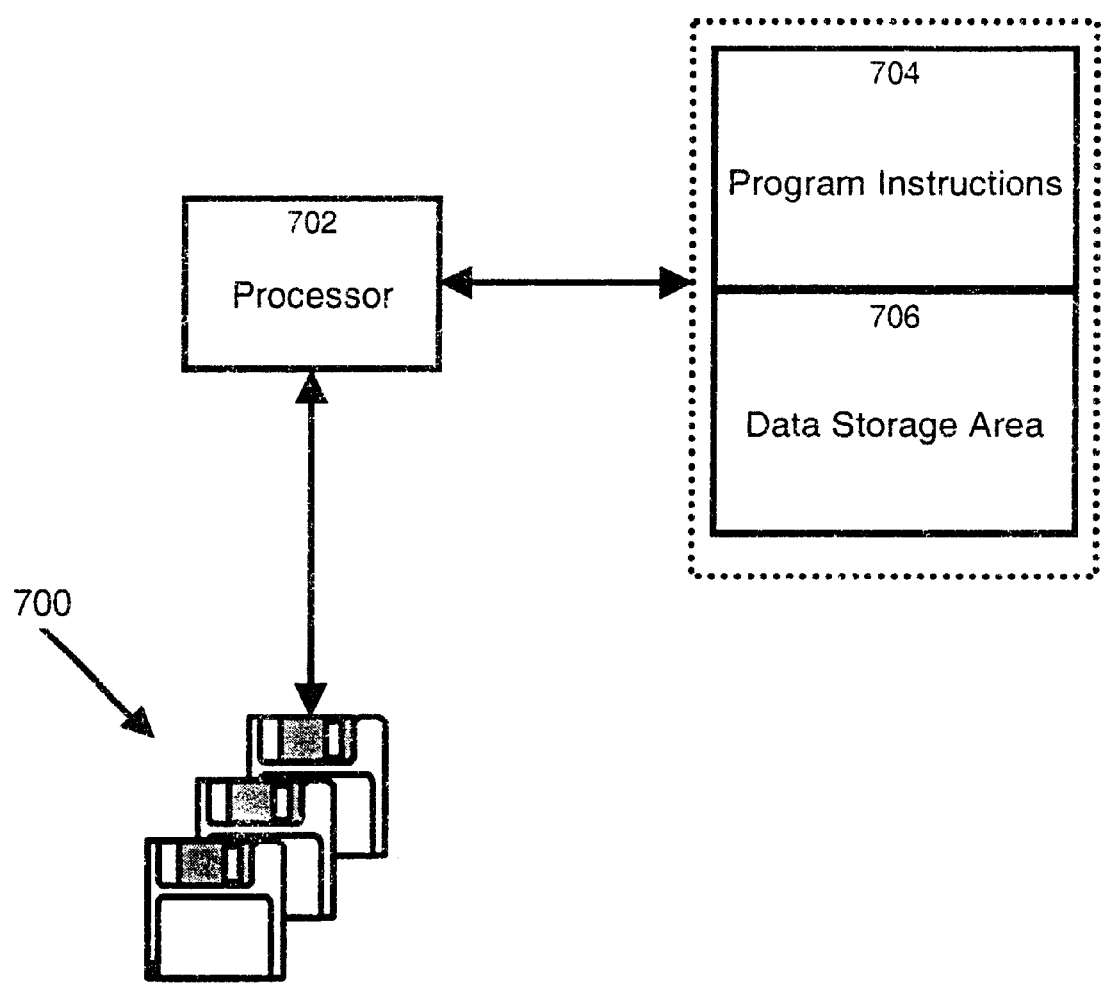
FIG. 7 shows an apparatus for generating a set of phrasal transcriptions in accordance with the spirit of the invention.

The above-described method for generating a set of phrasal transcriptions suitable for use in a speech recognition dictionary can also be implemented on any suitable computing platform as shown in FIG. 7. Such a computing platform typically includes a CPU 702 and a memory or computer readable medium 700 connected to the CPU 702 by a data communication bus. The memory stores the data 706 and the instructions of the program element 704 implementing the functional blocks depicted in the drawings and described in the specification. In a specific example, the program element 704 implements the processing unit 400. The program element 704 operates on the data 706 in accordance with the algorithms described above to generate a set of phrasal transcriptions suitable for use in a speech recognition dictionary using the techniques described in this specification.

Figure 8:
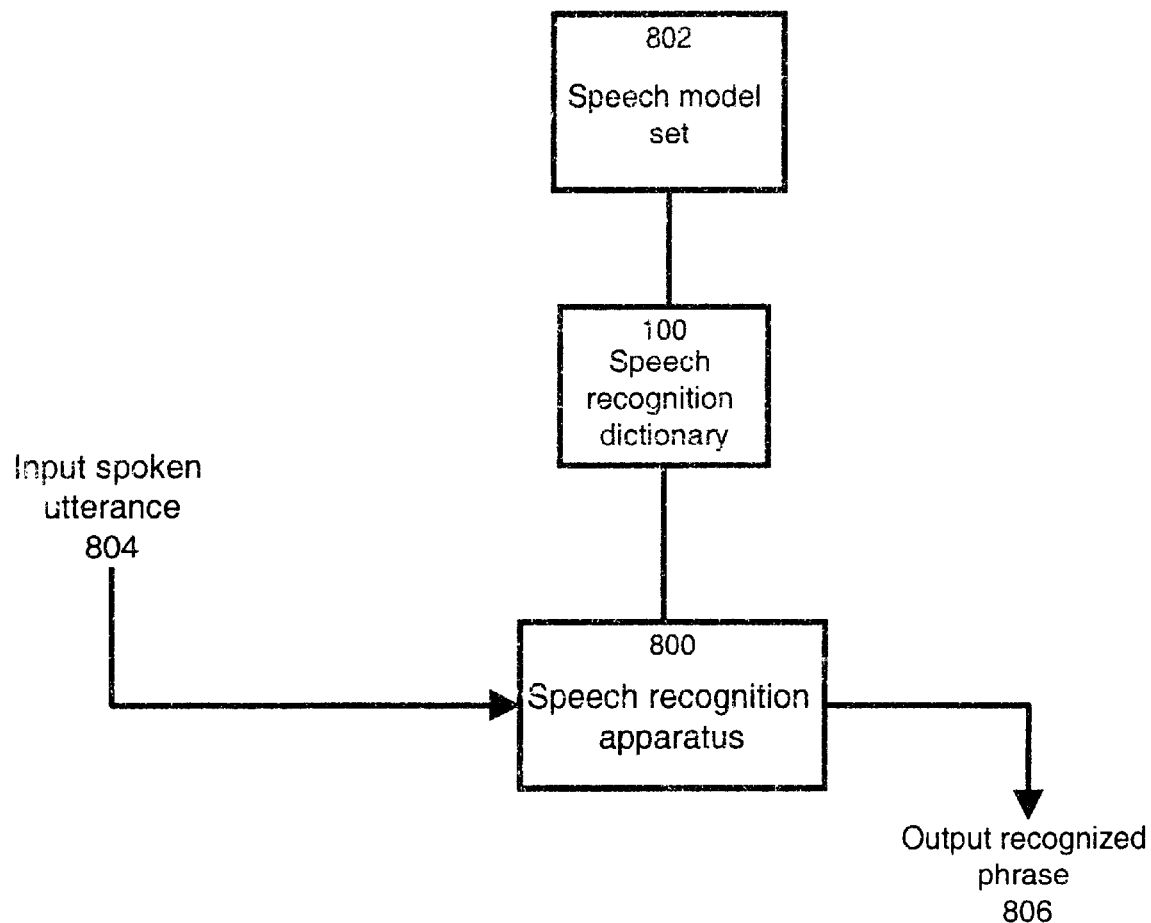
FIG. 8 shows a speech recognition apparatus comprising the computer readable medium shown in FIG. 1.

The speech recognition dictionary 100 comprising a set of phrasal transcriptions in accordance with the spirit of the invention may be used in a speech recognition enabled system such as a directory assistance system to provide multi-pronunciation speech recognition capabilities. Such a speech recognition enabled system, of the type depicted in FIG. 8, typically comprises an input 804 for receiving a signal derived from a spoken utterance, a processing unit 800 implementing speech recognition functionality and an output 806 for releasing the recognition results. The processing unit 800 is coupled to the speech recognition dictionary 100 having a plurality of vocabulary items. At least some vocabulary items in he speech recognition dictionary 100 are CD associated to a least two phrasal transcriptions generated by the method described in this specification. Each phrasal transcription comprises a sequence of word transcriptions. The speech recognition dictionary 100 is coupled to a speech model set 802 thereby providing an association between acoustic sub-word units in the phrasal transcriptions and the speech models in the speech model set 802. During the speech recognition process, the processing unit 800 makes use the speech models in the speech model set 802 to score the input utterance to obtain a match to the recognition result in the speech recognition dictionary 100. The functioning of a processing unit 800 providing speech recognition functionality is well-known in the art to which this invention pertains an consequently will not be described in further detail.

As a variant the method and apparatus for generating a set of phrasal transcriptions may be used in the context of a text to speech synthesizer in order to generate a most suitable pronunciation for a phrase. Typically, text to speech synthesizers allow a single pronunciation to be selected for synthesis on a basis of an orthographic representation of the phrase. The text to speech synthesizer makes use of the methods described in this specification to generate a set of phrasal transcriptions on a basis of an orthographic phrase. The top selection of the set of phrasal transcriptions is then selected for synthesis. The present invention is particularly useful when context dependent probabilities are incorporated in the selection of the phrasal transcriptions. In a specific example, the use of language probabilities in the selection of the phrasal transcriptions allows multi-language pronunciations to be generated by a same text to speech synthesizer by varying the language probability values.

Although the present invention has been described in considerable detail with reference to certain preferred embodiments thereof, variations and refinements are possible without departing from the spirit of the invention. Therefore, the scope of the invention should be limited only by the appended claims and their equivalents.

What is claimed is:

1. A method for generating a set of phrasal transcriptions suitable for use in a speech recognition dictionary, said method comprising:

providing an orthographic phrase comprising a set of vocabulary items;

generating a group of word transcriptions for each vocabulary item in the orthographic phrase, each word transcription in the group of word transcriptions for a given vocabulary item being associated to an ordering data element, the ordering data elements establishing a relationship between the word transcriptions in the group of word transcriptions;

permuting the word transcriptions to generate a plurality of phrasal transcriptions, each word transcription of a phrasal transcription in the plurality of phrasal transcriptions being selected from the group of word transcriptions associated to the corresponding vocabulary item;

computing a score data element for each phrasal transcription in said plurality of phrasal transcriptions on a basis of ordering data elements associated to the word transcriptions in a phrasal transcription;

selecting the set of phrasal transcriptions from said plurality of phrasal transcriptions at least in part on a basis of the score data elements;

storing the set of phrasal transcriptions in a format suitable for use by a speech recognition dictionary.

2. A method as defined in claim 1, wherein each word transcription is associated to a language probability data element, said score data elements being further derived on a basis of said language probability data elements.

3. A method as defined in claim 1, wherein each phrasal transcription in the plurality of phrasal transcriptions is associated to a language probability data element, said score data elements being further derived on a basis of said language probability data elements.

4. A method as defined in claim 1, wherein said ordering data element is a word transcription probability.

5. A method as defined in claim 1, wherein said ordering data elements are numerical values, a score data element associated to a given phrasal transcription being derived by taking a sum of the ordering data elements associated to the word transcriptions in the given phrasal transcription.

6. A method as defined in claim 5, wherein said numerical values are scalar quantities.

7. A method as defined in claim 1, wherein all word transcriptions in said group of word transcriptions for each vocabulary item in the orthographic phrase are permuted to generate the plurality of phrasal transcriptions.

8. A computer readable medium containing a speech recognition dictionary comprising phrasal transcriptions generated by the method defined in claim 1.

9. An apparatus for generating a set of phrasal transcriptions suitable for use in a speech recognition dictionary, said apparatus comprising:
- an input for receiving data elements representative of an orthographic phrase comprising a set of vocabulary items;
- a processing unit coupled to said input, said processing unit being operative for:
  - a) generating a group of word transcriptions for each vocabulary item in the orthographic phrase, each word transcription in the group of word transcriptions for a given vocabulary item being associated to an ordering data element, the ordering data elements establishing a relationship between the word transcriptions in the group of word transcriptions;
  - b) permuting the word transcriptions to generate a plurality of phrasal transcriptions, each word transcription of a phrasal transcription in the plurality of phrasal transcriptions being selected from the group of word transcriptions associated to the corresponding vocabulary item;
  - c) computing a score data element for each phrasal transcription in said plurality of phrasal transcriptions on a basis of ordering data elements associated to the word transcriptions in a phrasal transcription;
  - d) selecting the set of phrasal transcriptions from said plurality of phrasal transcriptions at least in part on a basis of the score data elements;
- an output coupled to said processing unit for releasing the set of phrasal transcriptions in a format suitable for use by a speech recognition dictionary.

10. An apparatus as defined in claim 9, wherein said processing unit comprises an automatic transcription generator for generating a group of word transcriptions for each vocabulary item in the orthographic phrase.

11. An apparatus as defined in claim 10, wherein said processing unit further comprises:
- a permutation generator unit coupled to said automatic transcription generator for permuting the word transcriptions to generate a plurality of phrasal transcriptions;
- a phrasal transcription selector unit coupled to said permutation generator unit, said phrasal transcription selector unit being operative for computing a score data element for each phrasal transcription in said plurality of phrasal transcriptions and selecting the set of phrasal transcriptions from said plurality of phrasal transcriptions.

12. An apparatus as defined in claim 9, wherein each word transcription is associated to a language probability data element, said score data elements being further computed on a basis of said language probability data elements.

13. An apparatus as defined in claim 9, wherein each phrasal transcription in the plurality of phrasal transcriptions is associated to a language probability data element, said score data elements being further computed on a basis of said language probability data elements.

14. An apparatus as defined in claim 9, wherein said ordering data elements are word transcription probabilities.

15. An apparatus as defined in claim 9, wherein said ordering data elements are numerical values, a score data element associated to a given phrasal transcription being computed at least in part by taking a sum of the ordering data elements associated to the word transcriptions in the given phrasal transcription.

16. An apparatus as defined in claim 15, wherein said numerical values are scalar quantities.

17. An apparatus as defined in claim 9, said apparatus comprising:
- a processor;
- a computer readable storage medium coupled to said processor, said computer readable storage medium comprising a program element for execution by said processor for implementing said processing unit.

18. A computer readable storage medium comprising a program element suitable for execution by a computing apparatus for generating a set of phrasal transcriptions suitable for use in a speech recognition dictionary, said computing apparatus comprising:
- a memory unit for storing an orthographic phrase comprising a set of vocabulary items;
- a processor operatively connected to said memory unit, said program element when executing on said processing unit being operative for:
  - a) generating a group of word transcriptions for each vocabulary item in the orthographic phrase, each word transcription in the group of word transcriptions for a given vocabulary being associated to an ordering data element, the ordering data elements establishing a relationship between the word transcriptions in the group of word transcriptions;
  - b) permuting the word transcriptions to generate a plurality of phrasal transcriptions, each word transcription of a phrasal transcription in the plurality of phrasal transcriptions being selected from the group of word transcriptions associated to the corresponding vocabulary item;
  - c) computing a score data element for each phrasal transcription in said plurality of phrasal transcriptions on a basis of ordering data elements associated to the word transcriptions in a phrasal transcription;
  - d) selecting the set of phrasal transcriptions from said plurality of phrasal transcriptions at least in part on a basis of the score data elements;
  - e) releasing the set of phrasal transcriptions in a format suitable for use by a speech recognition dictionary.

19. A computer readable storage medium as defined in claim 18, wherein each word transcription is associated to a language probability data element, said score data elements being further computed on a basis of said language probability data elements.

20. A computer readable storage medium as defined in claim 18, wherein each phrasal transcription in the plurality of phrasal transcriptions is associated to a language probability data element, said score data elements being further computed on a basis of said language probability data elements.

21. A computer readable storage medium as defined in claim 18, wherein said ordering data elements are word transcription probabilities.

22. A computer readable storage medium as defined in claim 18, wherein said ordering data elements are numerical values, a score data element associated to a given phrasal transcription being computed at least in part by taking a sum of the ordering data elements associated to the word transcriptions in the given phrasal transcription.

23. An apparatus for generating a set of phrasal transcriptions suitable for use in a speech recognition dictionary, said apparatus comprising:

- means for receiving data elements representative of an orthographic phrase comprising a set of vocabulary items;
- means for generating a group of word transcriptions for each vocabulary item in the orthographic phrase, each word transcription in the group of word transcriptions for a given vocabulary item being associated to an ordering data element, the ordering data elements establishing a relationship between the word transcriptions in the group of word transcriptions;
- means for permuting the word transcriptions to generate a plurality of phrasal transcriptions, each word transcription of a phrasal transcription in the plurality of phrasal transcriptions being selected from the group of word transcriptions associated to the corresponding vocabulary item;
- means for computing a score data element for each phrasal transcription in said plurality of phrasal transcriptions on a basis of ordering data elements associated to the word transcriptions in the phrasal transcription;
- means for selecting the set of phrasal transcriptions from said plurality of phrasal transcriptions at least in part on a basis of the score data elements;
- means for releasing the set of phrasal transcriptions in a format suitable for use by a speech recognition dictionary.

24. A method for generating a phrasal transcription suitable for use in a speech synthesizer, said method comprising:

- providing an orthographic phrase comprising a set of vocabulary items;
- generating a group of word transcriptions for each vocabulary item in the orthographic phrase, each word transcription in the group of word transcriptions for a given vocabulary item being associated to an ordering data element, the ordering data elements establishing a relationship between the word transcriptions in the group of word transcriptions;
- permuting the word transcriptions to generate a plurality of phrasal transcriptions, each word transcription of a phrasal transcription in the plurality of phrasal transcriptions being selected from the group of word transcriptions associated to the corresponding vocabulary item;
- computing a score data element for each phrasal transcription in said plurality of phrasal transcriptions on a basis of ordering data elements associated to the word transcriptions in a phrasal transcription;
- selecting the phrasal transcription from said plurality of phrasal transcriptions at least in part on a basis of the score data elements;
- releasing the phrasal transcription in a format suitable for use by a speech synthesizer.

* * * * *